UNITED STATES PATENT OFFICE.

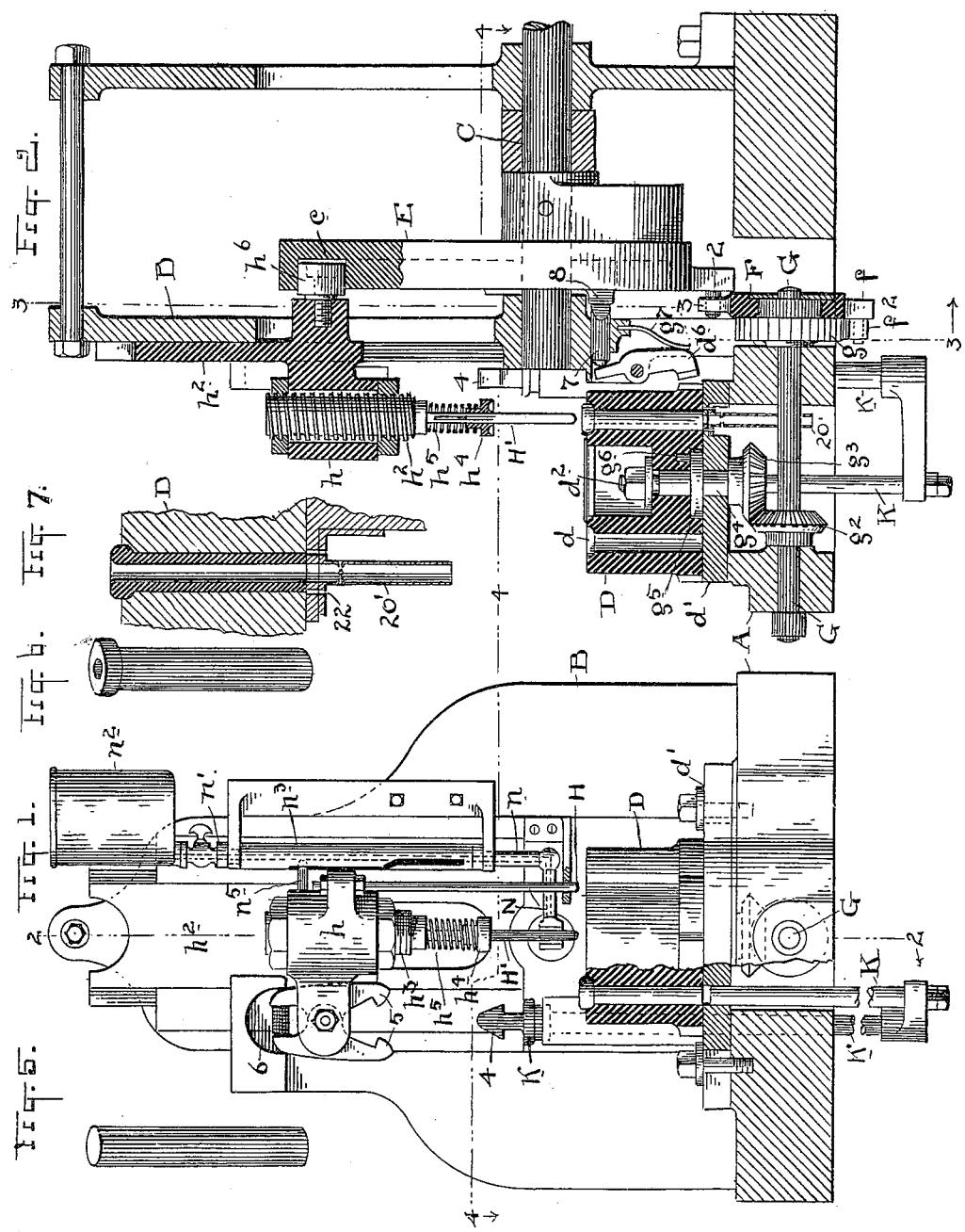

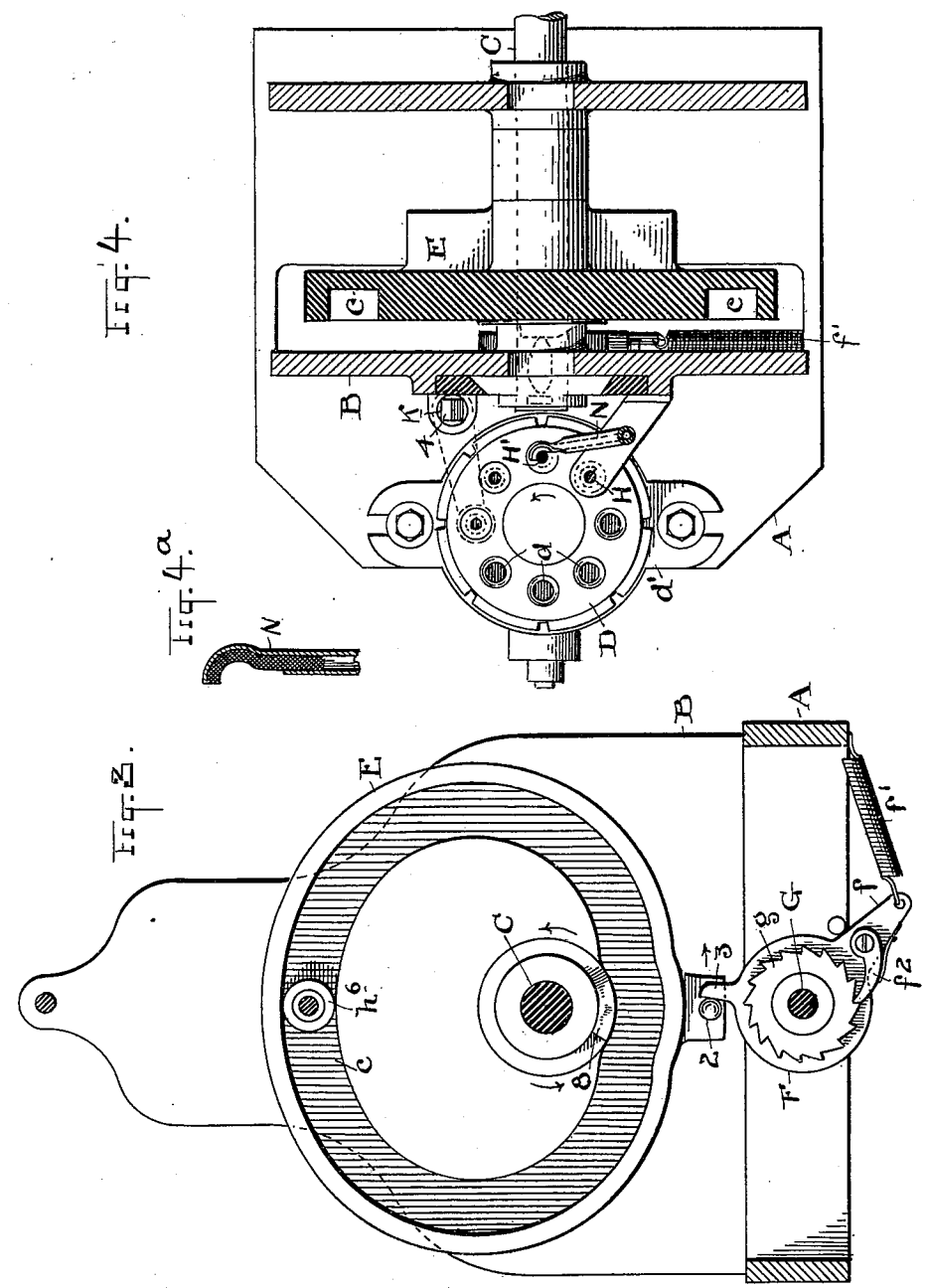

JOHANN HERMAN B. VON KÖNIGSLÖW, OF CLEVELAND, OHIO.

MACHINE FOR MOLDING IN CLAY, PORCELAIN, &c.

SPECIFICATION forming part of Letters Patent No. 643,417, dated February 13, 1900.

Application filed August 25, 1899. Serial No. 728,457. (No model.)

*To all whom it may concern:*

Be it known that I, JOHANN HERMAN B. VON KÖNIGSLÖW, a citizen of the United States, residing at Cleveland, in the county of Cuyahoga and State of Ohio, have invented certain new and useful Improvements in Machines for Molding in Clay, Porcelain, &c.; and I do declare that the following is a full, clear, and exact description of the invention, which will enable others skilled in the art to which it appertains to make and use the same.

My invention relates to machines for molding in clay, porcelain, and other materials; and the invention consists in the construction, combination, and arrangement of parts of the machine, substantially as shown and described, and particularly pointed out in the claims.

In the accompanying drawings, Figure 1 is a plain front elevation of one form or style of my new machine, slightly sectioned in one portion. Fig. 2 is a vertical sectional elevation of the machine on line 2 2, Fig. 1, showing especially the operative parts of the machine as disclosed on this line. Fig. 3, Sheet 2, is an elevation of the machine on a line corresponding to 3 3, Fig. 2, showing especially the cam-wheel and the ratchet mechanism operated thereby. Fig. 4 is a plan section on a line corresponding to 4 4, Figs. 1 and 2. Fig. 4$^a$ is a detail in section of a wick-finger for lubricating the finishing-plunger, as hereinafter described. Fig. 5 is a detail of a blank stick of clay or other material which has been prepared for molding into a tube in and by this machine. Fig. 6 is an elevation of the blank as it appears after undergoing the first step in the manufacture, and Fig. 7 is a longitudinal sectional elevation of a finished tube or product in position here to be ejected from the machine.

In the foregoing views I represent a machine which is adapted to produce a variety of articles from clay, porcelain, or other moldable earthen material which has been suitably prepared, whether in a powder, as for certain purposes, or in blanks, as for other purposes, and the views herein illustrated comprise means for operating with both classes of material. The mechanism enabling this to be done necessarily is different in some particulars, as will hereinafter appear, but is the same in the essential principles of the invention.

Referring first to the form of the machine illustrated in the drawings, A represents the bed of the machine, and B an upright supporting-stem and plate fixed thereon.

C is the power-shaft, and D is the turret or mold-head in which the tubes are formed. This head serves as the main part for the molding of the tubes, and is provided with a series of cylindrical holes $d$, extending through from top to bottom in a circle and of the size of the tube or other article to be made, whether relatively of the size shown or larger or smaller. It rests on a base $d'$ of its own, which has a hole at one side registering with the holes or molds $d$ as they are successively rotated around to that point in the intermittent forward rotary movement of the head. To rotate the said head intermittently, power is communicated from power-shaft C to the cam E, fixed on said shaft and which has a lug or projection 2 extending outward therefrom in position to engage a projection 3 on a rotatable wheel F on a shaft G. This wheel is free on shaft G and has an arm $f$, with a retracting-spring $f'$ and a pawl $f^2$ thereon to engage a ratchet-wheel $g$, which is fixed on shaft G. Hence every time the wheel F is turned by contact of the cam E therewith through lug 2 it will continue to turn until lug 2 disengages with lug 3 and ratchet $g$ will be correspondingly rotated through pawl $f^2$ and the shaft G therewith. This forward rotation is just enough to move the mold-head up one hole and no more. Then as lugs 2 and 3 disengage the wheel F is thrown back to its initial and normal position by its retracting-spring $f'$ and is in position to be again engaged and rotated on the next revolution of cam E. This gives the desired intermittent movement to the mold or head D, and in the interim, when it is quiet, the tube or other article to be made is made and finished in the mold, so far as this part of the process is concerned.

On shaft G is a bevel-gear $g^2$, which meshes with bevel-gear $g^3$ on a short vertical shaft $g^4$. This short shaft $g^4$ projects up through base-plate $d'$, on which the head D rests and into said head, and it is temporarily fixed to the head by a nut $d^2$ on its top, and the head is rotated in this instance by reason of a small collar or disk $g^5$ on the shaft $g^4$, set into the bottom of head D and having a pin $g^6$ entering the head. By simply removing nut $d^2$ a different head to produce a wholly different article may be substituted, and there is no limit practically to the many different things of widely-different design that may be made in this way. In this instance, however, the head is fashioned to make plain insulating-tubes with small heads, and in Fig. 5 I show a blank stick of plastic clay or earth adapted to this use. It is set into the turret or molding head D by the operator one at a time as the head revolves to the right place, and in Fig. 6 we see the result of the first step in the conversion of the blank.

I may and preferably do use two plungers to bore and finish the tube, the plunger H doing the roughing work in forming the bore and the plunger H' the finishing work and the two working successively on all the tubes in turn. Both plungers are fixed to the same head $h$, one in advance of the other the distance of one or more holes in mold-head D and both of a length to penetrate through said head and the tube therein. The plunger-rod H is fixed to a side lug on head $h$ or supported in some other good way and at its bottom has a guide to hold it in alinement. The plunger H' is held in the head $h$ by an exteriorly-threaded and adjustable screw $h^3$, and slidable on this plunger is a spring-pressed cap $h^4$ to engage over the top of the tube as it is being formed, the spring $h^5$ keeping it down.

The head $h$ is rigid, with a sash or frame $h^2$ sliding in suitable guides on the upright stem and plate B, and at the rear of the head $h$ on said sash is a projection in which is supported a roller $h^6$, adapted to run in a cam groove or channel in the face of cam E, which has been described as fixed on main shaft C to rotate therewith, the cam-groove $c$, in which roller $h^6$ travels, being eccentric sufficiently to the shaft C to give the desired up-and-down movement to the plungers, and of course are so arranged in respect thereto that the movements will be rightly timed.

When the product or tube is finished, it is ready to be thrust out, and an ejector or ejecting-pin K is used for this purpose. This pin works from below upward, and it is carried up and down by a line of mechanism shown in Fig. 1 particularly. Here we see a parallel actuating-rod $k$, with an arm on its bottom in which ejector K is fixed. This rod slides up and down in a suitable support and has a tapered and shouldered head 4 at its top adapted to automatically engage between the pair of spring-pressed catches 5, pivoted together at their middle on a projection from the head $h$. When the head $h$ descends, the head 4 of rod $k$ is gripped between the catches or dogs 5, and on its ascent the head $h$ carries ejector K high enough to lift the finished tube bodily out of head D. A further movement brings the upper ends of catches 5 into the rounded socket 6 above and causes them to spread at their lower ends and release the rod $k$, so that now it simply drops back with ejector K to its lowest place ready to be used again.

It is desirable to oil the finishing-plunger H', so that it shall leave a more finished and perfect bore in the tube and make smooth what might otherwise be a rough surface. To this end I employ a wick-finger N, Fig $4^a$, arranged in the machine to bear against the plunger practically its full length as the plunger descends, but so as to be rotated or carried to one side when the plunger is down. The means for doing this comprises a rotatable oil-supply-pipe section $n$, connected at its top by a suitable joint $n'$ with the oil can or reservoir $n^2$, and having the wick-arm N fixed thereon at its lower end. On the pipe-section $n$ is a sleeve $n^3$, with a longitudinal channel deflected at about its middle out of its original line, and in this channel runs a pin $n^5$ on head $h$. It follows when the head $h$ descends that it runs into the lower part of said channel at the right time to swing the arm N laterally out of the way after the plunger has been oiled, and in the reverse movement the said arm is thrown back again to oiling position. It is curved at its extremity to engage about the plunger sufficiently.

About the bottom of turret or mold head D are a series of grooves or notches adapted to be engaged by a dog $d^6$, so that for the time there will be no movement of the said head, but it is released for rotation at the right time by means of a short bolt 7, which is pressed out against the upper end of the dog $d^6$ by a projection 8 on the cam E, Fig. 3. Otherwise the spring $g^7$ keeps the said dog in locking position.

In Fig. 7 I show a tube 20' beneath plate $d'$ and registering with one or both the plunger-holes therein and constructed with a roughened interior more or less, and more or less air-opening near its top to prevent the clay from following the plunger back, and small holes 22 are made about the hole in the lower plate $d'$ to ventilate from the inside out and avoid air-blisters in the tube at its corresponding end.

What I claim as new, and desire to secure by Letters Patent, is—

1. The mold-head having openings through from top to bottom and means to rotate said head, in combination with a stationary base-plate having a discharge-opening for the surplus product received from the mold-openings, a forming-plunger above said discharge-opening, a receptacle below said discharge-opening to receive the cast-off stock and means within said receptacle to prevent the stock from following the plunger back, substantially as described.

2. A rotatable head having a series of molds in a circle, a plunger to enter each mold successively, and means to operate said head and plunger, in combination with a stationary base-plate provided with a single discharge-opening for the waste product, and a tube having a roughened interior to receive said waste product and prevent its following the plunger back, substantially as described.

3. A rotatable head having mold-openings from top to bottom, a forming-plunger for said mold-openings, and means to operate said head and plunger, in combination with a stationary base-plate having an opening of less size than the mold-openings for the discharge of the cast-off product, a gripping-tube below said discharge-opening to receive and temporarily retain said cast-off product, and vent-openings in said plate arranged about the bottom of the vertical sides of said mold-openings, substantially as described.

4. The rotatable mold-head having a series of molds in a circle, in combination with a reciprocating frame, a set of plungers adjustably held upon said frame and comprising a roughing-plunger and a finishing-plunger, a sliding spring-pressed cap on said finishing-plunger for forming the top of the product, and means to operate said mold-head and reciprocating frame, substantially as described.

5. The combination of an adjustable base-plate $d'$, a removable and interchangeable mold-head D, a vertical power-transmitting shaft $g^4$ having interlocking and fastening means for said mold-head, a locking-dog $d^6$ for said head and means to unlock and rotate said head at intermittent intervals, and a reciprocating plunger H′ having a spring-pressed cap $h^4$ above said mold-head, substantially as described.

6. The combination of the rotatable mold-head D, and reciprocating plunger H′ held in the head $h$, and an oscillatory oil-supply pipe $n$ having a supply-can $n^2$ at its top and a wick-finger N at its bottom, and means on said pipe and head $h$ to throw said wick-arm into and out of engagement with said plunger, substantially as described.

7. An adjustable base-plate $d'$ and a rotatable mold-head D mounted thereon, power-transmitting shafts for said head, pawl-and-ratchet mechanism for said shafts, and a locking-dog $d^6$ for said mold-head, in combination with a reciprocating frame $h^2$, forming-plungers adjustably held on said frame, an ejector K, an ejector-actuating rod having a shouldered head 4, catches 5 on the reciprocating frame, releasing-socket 6, and a rotating cam E to operate said frame, dog, and ratchet mechanism, substantially as described.

8. A rotatable mold-head having a series of through-openings, a forming-plunger for said openings, an ejector for the finished product, and means to operate said head, plunger and ejector, in combination with a stationary base-plate below said rotatable head, discharge-openings for the cast-off product in said base-plate, and a gripping device for said discharge-openings to receive and prevent the cast-off product from following the plunger back, substantially as described.

9. The rotatable mold-head having a series of mold-openings, in combination with a reciprocating frame, forming-plungers adjustably held upon said frame, an ejector below said mold-openings, a rod $k$ having a shouldered head 4 connected to said ejector, pivoted spring-pressed catches 5 on said reciprocating frame in line with said head, a fixed rounded socket 6 to open said catches, and means to operate said head and frame, substantially as described.

Witness my hand to the foregoing specification this 27th day of July, 1899.

JOHANN HERMAN B. V. KÖNIGSLÖW.

Witnesses:
H. E. MUDRA,
R. B. MOSER.